(12) United States Patent
Suarez

(10) Patent No.: US 7,144,142 B1
(45) Date of Patent: Dec. 5, 2006

(54) ILLUMINATED COVER FOR A BRAKE CALIPER

(76) Inventor: Jaimie Suarez, 9641 Richeon Ave., Downey, CA (US) 90240

( * ) Notice: Subject to any disclaimer, the term of this patent is extended or adjusted under 35 U.S.C. 154(b) by 126 days.

(21) Appl. No.: 10/932,773

(22) Filed: Sep. 2, 2004

(51) Int. Cl.
*B60Q 1/00* (2006.01)

(52) U.S. Cl. .................. 362/500; 362/545; 40/587

(58) Field of Classification Search ............... 362/500, 362/545, 541; 40/587, 606.12
See application file for complete search history.

(56) References Cited

U.S. PATENT DOCUMENTS

| | | | |
|---|---|---|---|
| 5,548,274 A | * | 8/1996 | Anderson et al. ........... 340/468 |
| 5,800,035 A | | 9/1998 | Aichele |
| 6,168,301 B1 | | 1/2001 | Martinez et al. |
| 6,322,237 B1 | | 11/2001 | Lee |
| 6,457,566 B1 | * | 10/2002 | Toby .................... 188/1.11 W |
| 6,612,726 B1 | * | 9/2003 | Gloodt et al. ............... 362/500 |
| 2003/0151924 A1 | | 8/2003 | Gloodt et al. |
| 2003/0198059 A1 | | 10/2003 | Castro |

* cited by examiner

*Primary Examiner*—Renee Luebke
*Assistant Examiner*—Zahra I. Bennett
(74) *Attorney, Agent, or Firm*—Eric Karich

(57) ABSTRACT

An illuminated cover is disclosed for a brake caliper, including means for mounting the cover over the brake caliper, a front surface positioned such that when the cover is mounted over the brake caliper the front surface covers a front face of the brake caliper, an illuminated display disposed on the front surface, and a power source operably connected to the illuminated display via a controller.

2 Claims, 2 Drawing Sheets

ILLUMINATED COVER FOR A BRAKE CALIPER

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to vehicle accessories, and more particularly to light producing devices for vehicles.

2. Description of Related Art

The following art defines the present state of this field:

Gloodt et al., US 2003/0151924 A1, describes an assembly for providing illumination through an automobile wheel. The assembly includes a bracket that is adapted to be secured to a brake caliper, and a light emitting diode array connected to the bracket for display adjacent to the brake caliper. A rechargeable battery is electrically connected to the light emitting diode array so that the LEDs shines light through the wheel from adjacent the brake caliper.

Castro, US 2003/0198059 A1, describes a vehicle wheel illumination device that includes lights (such as LEDs) that project light onto the inside portion of a wheel's rim. The lights are mounted to a fixed portion of the vehicle, such as the top of the caliper, for shining light on the inside surface of the wheel rim.

Lee, U.S. Pat. No. 6,322,237 B1, describes a lighted wheel rim system which provides for illuminating the wheel of a vehicle by projecting visible light through decorative openings disposed within the rim of a tire. The lighted wheel rim system includes a plurality of individual lights and flange portions configured for mounting to the brake rotor splash guards or brake shield of a vehicle. The flange portions are dimensioned to correspond to the outer curvature, shape, and size of the brake shield and to hold the light housing assembly in spaced apart relation therefrom. Each wheel of a vehicle is configured with a ring of individual lights as an integrated electrical system.

Aichele, U.S. Pat. No. 5,800,035, describes a wheel lighting apparatus that includes a transparent chamber mounted to the wheel, and a light source positioned in the chamber. An electrical connector device is provided to connect a power source mounted on the vehicle body to the light source. The electrical connector device includes a pair of circular rings of electrically conductive material mounted to the wheel and electrically insulated therefrom. The electrical connector device also includes a pair of contactors mounted to the body, each having an electrically conductive movable contact portion in electrical contact with their respective circular rings. A pair of electrical conductors are provided for electrically connecting the terminals of the power source to the light source through the flexible contact portion of flexible connectors and their respective rings.

Martinez et al., U.S. Pat. No. 6,168,301 B1, describes a system for illuminating a wheel that includes a contact ring attached to the wheel, and a contact brush mounted to a stationary structure (such as a brake caliper). At least one electrical light emitting device is electrically connected to the layer of electrically conductive material on the contact ring, so that electrical power from the power source reaches the light emitting device through the contact brush and through the contact ring.

The above-described references are hereby incorporated by reference in full.

The prior art teaches various lighting devices that use the brake caliper as a mounting point. However, the prior art does not teach a lighting device that is adapted to be mounted over the face of a brake caliper. The present invention fulfills these needs and provides further related advantages as described in the following summary.

SUMMARY OF THE INVENTION

The present invention teaches certain benefits in construction and use which give rise to the objectives described below.

An illuminated cover is disclosed for a brake caliper, including means for mounting the cover over the brake caliper, a front surface positioned such that when the cover is mounted over the brake caliper the front surface covers a front face of the brake caliper, an illuminated display disposed on the front surface, and a power source operably connected to the illuminated display via a controller.

A primary objective of the present invention is to provide an illuminated cover having advantages not taught by the prior art.

Another objective is to provide a illuminated cover that functions to provide a decorative cover over a brake caliper.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
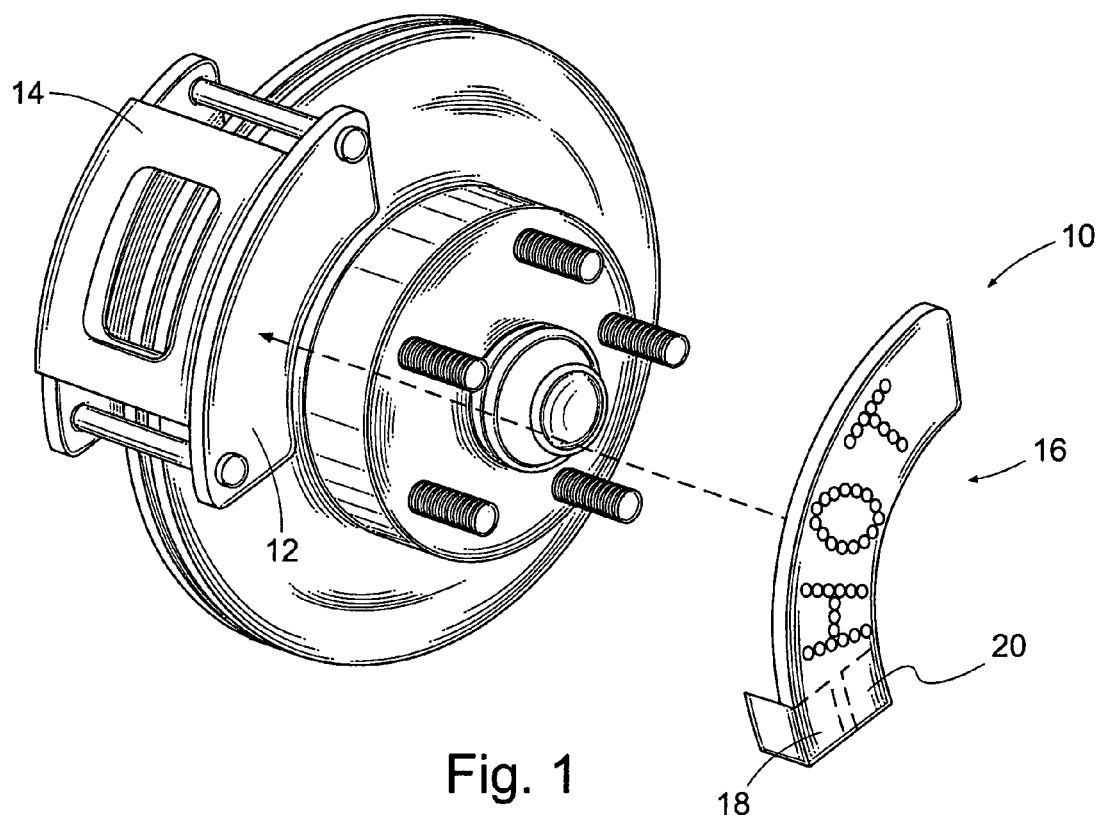
FIG. 1 is a perspective view of a disc brake caliper illustrating placement of one embodiment of an illuminated cover over a front face of the caliper.
Figure 2:
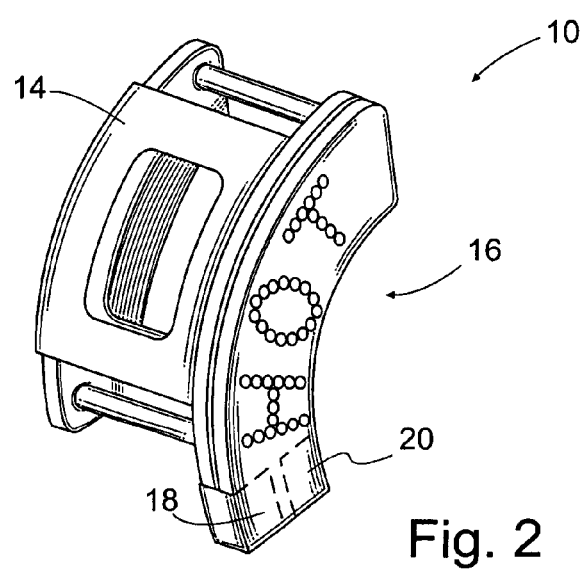
FIG. 2 is a perspective view of the caliper 14 of FIG. 1 wherein the illuminated cover is mounted over the front face of the caliper.
Figure 3:
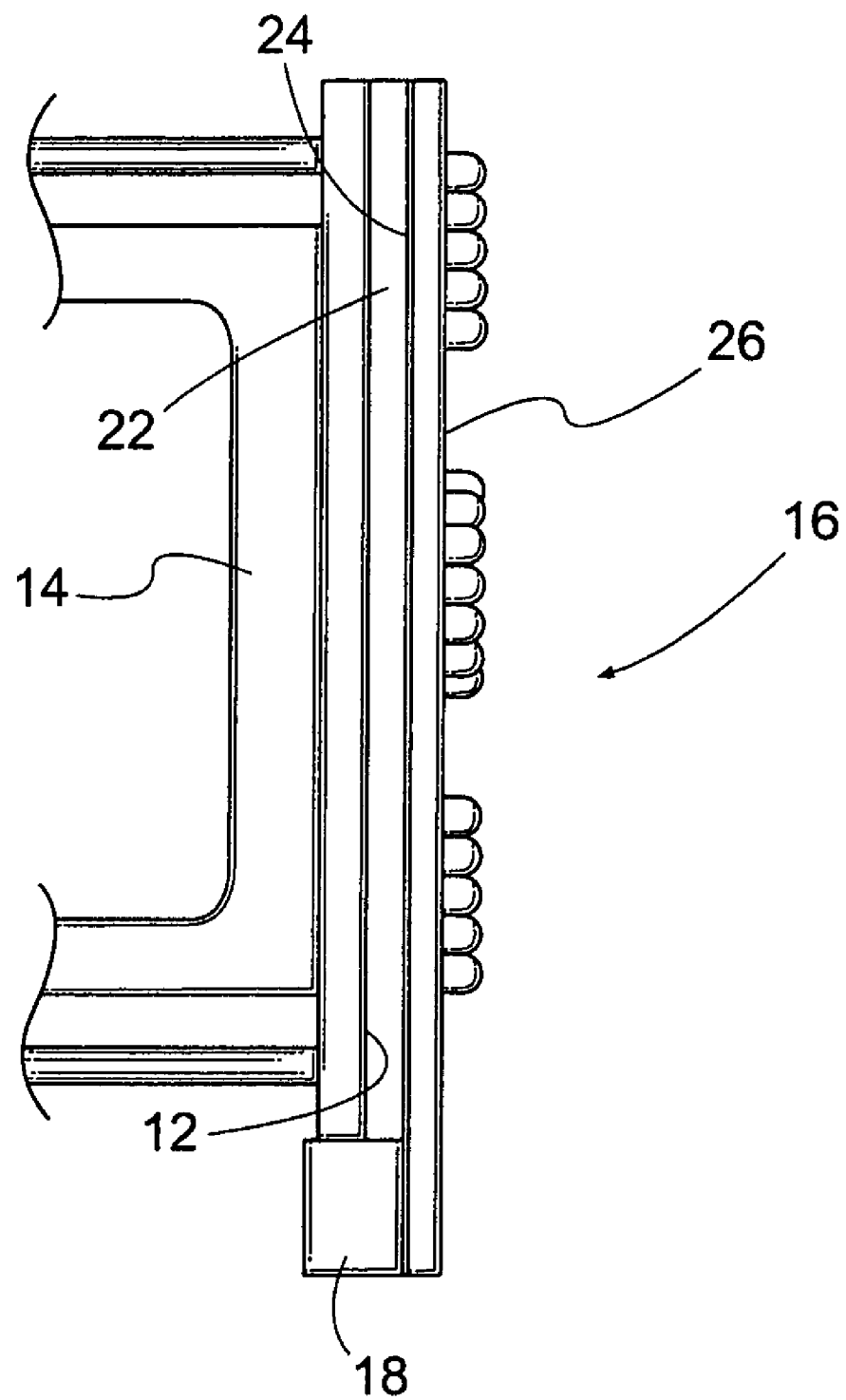
FIG. 3 is a top plan view of a portion of the caliper of FIG. 2 including the front face.

FIG. 1 is a perspective view of a disc brake caliper 14 illustrating placement of one embodiment of an illuminated cover 10 over a front face 12 of the caliper 14. FIG. 2 is a perspective view of the caliper 14 of FIG. 1 wherein the illuminated cover 10 is mounted over the front face 12 of the caliper 14. FIG. 3 is a top plan view of a portion of the caliper 14 of FIG. 2 including the front face 12.

Referring to FIGS. 1–3, the illuminated cover 10 includes an illuminated display 16, a power source 18, and a controller 20. In the embodiment of FIGS. 1–3, a magnet 22 attached to a rear surface 24 of the illuminated cover 10 is used to mount the illuminated cover 10 to the front face 12 of the brake caliper 14. In general, the magnet 22 represents means for mounting the illuminated cover 10 to the brake caliper 14. It is noted that other means for mounting the illuminated cover 10 to the brake caliper 14 are possible and contemplated, including but not limited to bolts, adhesives, or other forms of attachment that are known in the art.

A front surface 26 of the illuminated cover 10 is positioned such that when the illuminated cover 10 is mounted over the brake caliper 14, the front surface 26 covers the front face 12 of the brake caliper 14. That is, when the illuminated cover 10 is mounted over the brake caliper 14 and a corresponding wheel is mounted over the brake caliper 14, the front surface 26 of the illuminated cover 10 is positioned adjacent the front face 12 of the of the brake caliper 14 and between the front face 12 and the corresponding wheel.

The illuminated display 16 is located on the front surface 26 of the illuminated cover 10. When the illuminated cover 10 is mounted over the brake caliper 14 and the corresponding wheel is mounted over the brake caliper 14, the front surface 26, and the illuminated display 16 located thereon, are visible through openings of the corresponding wheel.

The illuminated display 16 receives electrical power from the power source 18 via the controller 20. In general, the power source 18 supplies electrical power to the controller 20. The power source 18 may be or include, for example, a battery, a generator, a direct attachment to a vehicle battery, or other form of power known to those skilled in the art. The controller 20 provides electrical power (i.e., electrical voltage and current) to the illuminated display 16 to ensure proper starting and a desired operation of the illuminated display 16, and may include a resistor (not shown), any converters that may be required, or other elements that would be known to those skilled in the art.

In general, the illuminated display 16 produces light when activated by the controller 20. In the embodiment of FIGS. 1–3, the illuminated display 16 includes multiple light-emitting diodes (LEDs) coupled in series and/or in parallel. The LEDs are arranged such that they form the letters "H," "O," and "T" and in that order, thus forming the word "HOT." Thus the illuminated display 16 preferably produces light in a way that sends a visual message. Light producing elements of the illuminated display 16 preferably form symbols (e.g., letters or numbers) or graphic images. The lighted symbols may also be arranged to form words such as names or slogans.

The illuminated display 16 is not limited to LEDs, but could include any form of lighting, including electroluminescent (EL) materials, incandescent bulbs, or other forms of lighting known to those skilled in the art.

The controller 20 preferably activates the illuminated display 16 only under certain circumstances (e.g., only at night, only when braking, only when braking at night, etc.), and the controller 20 preferably includes one or more sensors to detect the circumstances. Such sensors are known and commercially available.

In the embodiment of FIGS. 1–3, the controller 20 limits electrical voltage and/or current provided to the LEDs such that the LEDs do not draw excessive electrical power and fail prematurely. The controller 20 may also provide electrical power to the LEDs such that the LEDs are turned on and off to flash in certain patterns, or sequentially such that it appears that the light emitted by the LEDs is moving. Further, the LEDs may generate light having different colors, and the controller 20 may also provide electrical power to the LEDs such that the LEDs generate different colors of light in certain circumstances (e.g., while braking).

In other embodiments, the illuminated display 16 may include one or more electroluminescent (EL) devices or strips. In general, EL devices require an alternating current (AC) voltages having suitable magnitudes and frequencies to stimulate phosphor coatings sandwiched between pairs of electrodes. In this situation, the controller 20 may include an inverter circuit that generates an AC voltage having a suitable magnitude and frequency, and provides the AC voltage to the illuminated display 16 when the illuminated display 16 is to be activated.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A brake caliper comprising:
   a front face of the brake caliper;
   an illuminated cover mounted directly on the front face of the brake caliper;
   a front surface of the illuminated cover that is positioned such that when the illuminated cover is mounted over the brake caliper, the front surface covers the front face but does not extend beyond the front face of the brake caliper;
   an illuminated display disposed on the front surface; and
   a power source operably connected to the illuminated display via a controller.

2. A method of decorating a brake caliper, the method comprising the steps of:
   providing a brake caliper having a front face;
   providing an illuminated cover having a front surface that includes an illuminated display disposed on the front surface;
   mounting the illuminated cover directly on the front face of the brake caliper such that the front surface of the illuminated cover covers the front face of the brake caliper but does not extend beyond the front face of the brake caliper; and
   operably connecting the illuminated display to a power source via a controller.

* * * * *